United States Patent [19]
Lew

[11] Patent Number: 5,078,014
[45] Date of Patent: Jan. 7, 1992

[54] CONVECTIVE INERTIA FORCE FLOWMETER

[76] Inventor: Hyok S. Lew, 7890 Oak St., Arvada, Colo. 80005

[21] Appl. No.: 518,172

[22] Filed: May 3, 1990

Related U.S. Application Data

[63] Continuation-in-part of Ser. No. 164,541, Mar. 7, 1988.

[51] Int. Cl.$^5$ ............................................... G01F 1/84
[52] U.S. Cl. .................................................. 73/861.38
[58] Field of Search ........................... 73/861.37, 861.38

[56] References Cited

U.S. PATENT DOCUMENTS 4,829,832  5/1989  Lew ................................. 73/861.38
4,938,075  7/1990  Lew ................................. 73/861.38

Primary Examiner—Herbert Goldstein

[57] ABSTRACT

A mass flowmeter comprises a conduit of a looped configuration with two extremities secured to a rigid support wherein each of the two half sections of the conduit extend from each of the two secured extremities of the conduit and is curved over a loop angle generally equal to or less than 315 degrees, and the two half sections of the conduit over-lap one another over a portion thereof with a space therebetween; wherein an electromagnetic vibrator exerts a vibratory force on the overlapping portion of the two half sections of the conduit generating a relative flexural vibration between the two half sections of the conduit, and a pair of motion sensors respectively measure the flexural vibrations of the two half sections of the conduit, which combination determines mass flow rate of media moving through the conduit from difference between two flexural vibrations respectively measured by the two motion sensors.

5 Claims, 4 Drawing Sheets

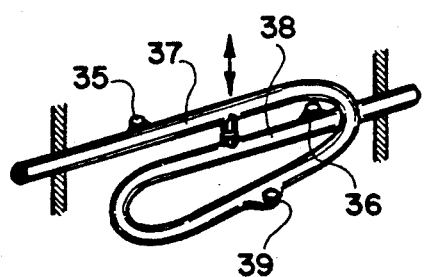
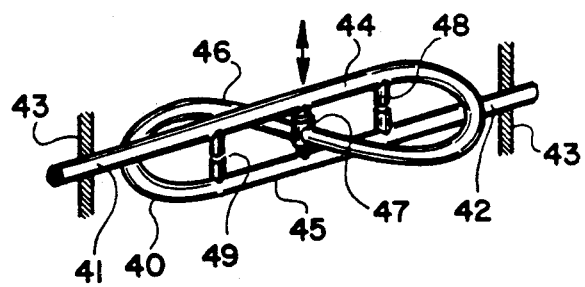
Fig. 5  Fig. 6
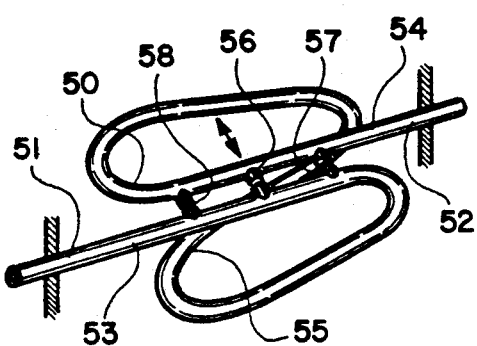
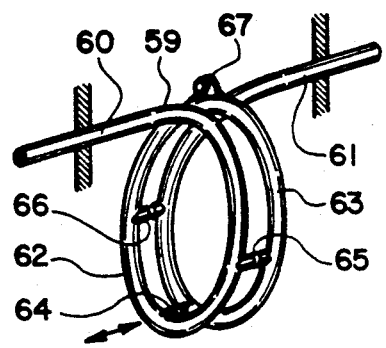
Fig. 7  Fig. 8
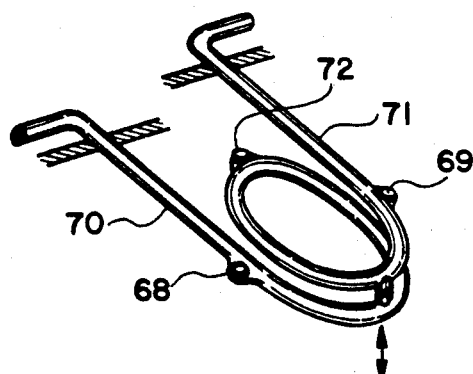
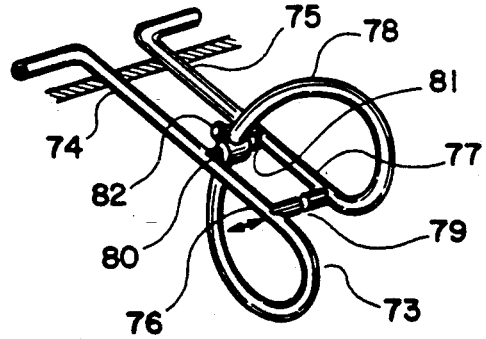
Fig. 9  Fig. 10
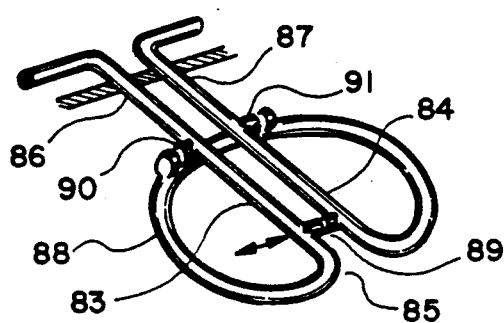
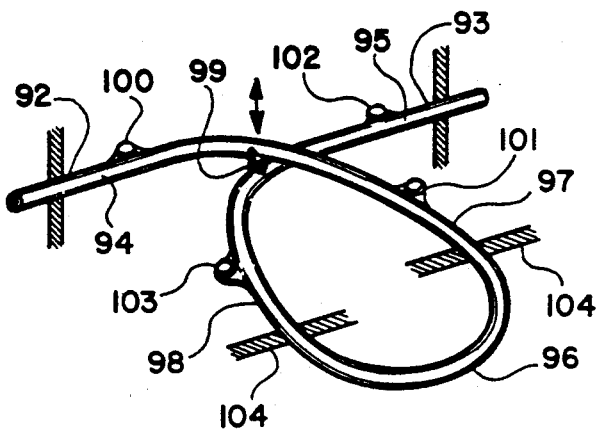
Fig. 11  Fig. 12

CONVECTIVE INERTIA FORCE FLOWMETER

BACKGROUND OF THE INVENTION

This is a continuation-in-part application to patent application Ser. No. 07/164,541 entitled "Convective Inertia Force Flowmeter" filed on Mar. 7, 1988.

The flowmeter of the present invention comprises a conduit providing a flow passage fixed to a rigid frame at the two extremities that includes a loop wherein two halves of the conduit over-lap one another with a spaced relationship. An electromagnetic vibrator disposed at the over-lapping section of the conduit laterally vibrates the two halves of the conduit relative to one another and generates flexural vibration of the conduit with amplitude varying along the length of the conduit, which are zero only at the two fixed extremities of the conduit and at the nodal point located at the midsection of the conduit. The fluid moving through the conduit exerts a convective inertia force resulting from the varying amplitude of the flexural vibration of the conduit, distribution of which along the length of the conduit is symmetric about the midsection of the conduit, that generates flexural vibration of the conduit having symmetric mode about the midsection of the conduit that is superimposed on the flexural vibration of the conduit having antisymmetric mode about the midsection of the conduit that is generated by the electromagnetic vibrator. The mass flow rate of the fluid moving through the conduit is determined by measuring the symmetric component of the flexural vibration of the conduit, which measurement is carried out by measuring the difference in the phase angle of the flexural vibrations between the two halves of the conduit or by measuring the amplitude of the flexural vibrations at the midsection of the conduit. A mass flowmeter operating on the same principles as described herein may comprise a generally U-shaped conduit with two halves thereof vibrated relative to one another, wherein one extremity of each of the two halves of the conduit includes a flexible coupling, or a pair of parallel conduits vibrated relative to one another, wherein one extremity of each of the pair of conduits includes a flexible coupling.

While many different versions of the mass flowmeter known by the name of "Coriolis force flowmeter" have been introduced into the industrial flow measurement fields and have received an enthusiastic welcome from many users, it is this inventor's opinion that many of these versions were invented and designed without having an indepth and accurate understanding of the operating principles thereof and, consequently, these versions have failed to utilize the physical principles and mathematical relationships dictating the performance thereof to the fullest extent. One glaring example of misunderstanding about the "Coriolis force flowmeter" is the name itself, which is a misnomer. The acceleration or deceleration of fluid produces inertia or dynamic reaction force associated therewith and counteracts the action force causing the acceleration or deceleration. In the Eulerian description of fluid motion, the acceleration experienced by the moving fluid is classified into two categories; the local acceleration and the convective acceleration. The inertia force associated with the convective acceleration is called "convective inertia force", which is equal to the mass flow flux density times the gradient of the fluid velocity. Every mass flowmeter employing one or more vibrating conduits determines the mass flow rate of the fluid by measuring an effect of the convective inertia force, whether the mass flowmeter is called a "Coriolis force flowmeter" or some other name.

BRIEF SUMMARY OF THE INVENTION

The primary object of the present invention is to provide a mass flowmeter that employs the simplest form of vibrating conduits and, yet, has the most pronounced effect of convective inertia force. As a consequence, the mass flowmeter of the present invention has a great turn-down ratio and high sensitivity.

Another object is to provide a mass flowmeter comprising a single conduit with two extremities fixed to a rigid frame that includes a looped midsection of loop angle generally equal to or less than 450 degrees, wherein the two sections of the conduit respectively adjacent to the two fixed extremities of the conduit and connected to one another by the looped midsection of the conduit overlap one another in a spaced relationship over a portion thereof, where an electromagnetic vibrator vibrates the two sections of the conduit laterally relative to one another. The mass flow rate is determined from the difference in the flexural vibrations of the two sections of the conduit, which are measured by two motion detectors respectively included in the two sections of the conduit, or from the flexural vibrations at the nodal section coinciding with the midsection of the conduit that is measured by a motion detector disposed at the midsection of the conduit.

A further object is to provide a mass flowmeter comprising a single conduit with two extremities fixed to a rigid frame, that includes two 360 degree loops turning in two opposite directions, wherein the two sections of the conduit respectively adjacent to the fixed extremities of the conduit and connected to one another by the two 360 degree loops over-lap one another and sandwich the midsection of the conduit therebetween in a spaced relationship, which two sections are vibrated laterally relative to one another by an electromagnetic vibrator. The mass flow rate is determined from the difference in the flexural vibrations of the two sections of the conduit or from the flexural vibrations at the nodal section coinciding with the midsection of the conduit where the flexural vibration is absent when there is no fluid flow through the conduit.

Yet another object is to provide a mass flowmeter comprising a single conduit with two extremities fixed to a rigid frame, that includes two sections of the conduit respectively adjacent to the two fixed extremities and connected to one another by a looped midsection of loop angle generally equal to or less than 630 degrees, which two sections are vibrated laterally relative to one another by an electromagnetic vibrator. The mass flow rate is determined from the difference in the flexural vibrations of the two sections of the conduit, which may be measured in the form of the phase angle difference therebetween, or from the flexural vibrations at the nodal section coinciding with the midsection of the conduit where the flexural vibration is absent when there is no fluid flow through the conduit.

Yet a further object is to provide a mass flowmeter comprising a single conduit with two extremities fixed to a rigid frame, that includes two sections of the conduit respectively adjacent to the two fixed extremities and connected to one another by a 360 degree loop of the conduit, wherein one portion of the 360 degree loop and one of the two sections of the conduit are symmetric about a section where the two halves of the conduit overlap in a spaced relationship, and the other portion of the 360 degree loop and the other of the two sections of the conduit are also symmetric about the same section where the conduit overlap. An electromagnetic vibrator disposed at the section where the conduits overlap vibrates the two combinations of the conduit sections relative to one another. The mass flow rate is determined from the difference in the flexural vibrations of the conduit sections between the two conduit sections included in one of the two combinations of the conduit sections.

Still another object is to provide a mass flowmeter comprising a pair of conduit sections disposed parallel to one another and connected to one another in series, wherein one extremity of each of the two conduit sections includes a flexible coupling, whereby an electromagnetic vibrator vibrates the two conduit sections relative to one another. The mass flow rate is determined from the difference in the flexural vibrations between the two conduit sections.

Still a further object is to provide a mass flowmeter comprising a pair of parallel conduits connected to a common inlet and outlet legs in parallel arrangement, wherein two extremities of the conduits respectively belonging to the two conduits and disposed at two opposite ends include flexible couplings. An electromagnetic vibrator disposed at the midsection of the combination of the two parallel conduits generates flexural vibrations of the conduits relative to one another. The mass flow rate is determined from the difference in the relative flexural vibrations between the two halves of the combination of the two parallel conduits.

These and other objects of the present invention will become clear as the description thereof progresses. The present invention may be described with a great clarity and specificity by referring to the figures, of which descriptions follow.

BRIEF DESCRIPTION OF THE FIGURES

FIG. 5 illustrates yet another embodiment of the mass flowmeter of the present invention comprising a single 360 degree loop of the conduit.

FIG. 6 illustrates an embodiment of the mass flowmeter of the present invention comprising a double 360 degree loop section of the conduit respectively turning in two opposite directions.

FIG. 7 illustrates another embodiment of the mass flowmeter of the present invention comprising a double 360 degree loop section of the conduit respectively turning in two opposite directions.

FIG. 8 illustrates a further embodiment of the mass flowmeter of the present invention comprising a double 360 degree loop of the conduit arranged like a coil spring.

FIG. 9 illustrates an embodiment of the mass flowmeter of the present invention comprising a single 540 degree loop of the conduit, which are arranged similarly to the embodiment shown in FIG. 2.

FIG. 10 illustrates an embodiment of the mass flowmeter of the present invention comprising two parallel sections of the conduit respectively extending to the inlet and outlet legs, wherein the two parallel sections of the conduit are connected to one another in series by a looped section of the conduit.

FIG. 11 illustrates another embodiment of the mass flowmeter of the present invention comprising two parallel sections of the conduit respectively extending to the inlet and outlet legs, wherein the two parallel sections of the conduit are connected to one another by a looped section of the conduit.

FIG. 12 illustrates an embodiment of the mass flowmeter of the present invention comprising two sections of the conduit respectively extending to the inlet and outlet legs, wherein the two sections of the conduit are connected to one another by a 360 degree loop of the conduit including two sections thereof respectively disposed in a symmetric arrangement to the two sections of the conduit extending to the inlet and outlet legs, respectively.

DESCRIPTION OF THE ILLUSTRATED EMBODIMENTS

Figure 1:
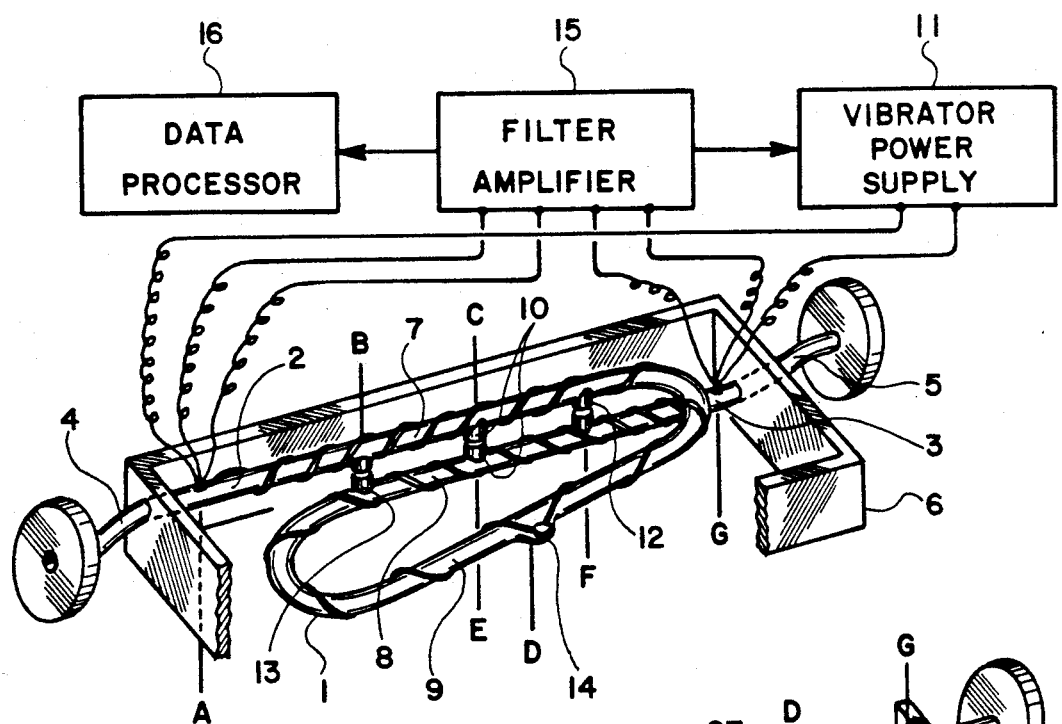
FIG. 1 illustrates a perspective view of an embodiment of the mass flowmeter of the present invention comprising a single 360 degree loop section of the conduit.

In FIG. 1 there is illustrated a perspective view of an embodiment of the mass flowmeter that comprises a single conduit 1 with two extremities 2 and 3 respectively connected to the inlet leg 4 and outlet leg 5 and affixed to a rigid frame 6, which conduit includes two generally straight sections 7 and 8 respectively extending towards one another in an over-hanging arrangement from the fixed extremities 2 and 3, and connected to one another by a looped section 9 of loop angle generally equal to or less than 450 degrees. The particular embodiment shows a combination having a looped midsection of 360 degree loop angle. An electromagnetic vibrator 10 energized by the vibrator power supply 11, that is disposed on the middle plane between the two fixed extremities 2 and 3 of the conduit 1, vibrates the two generally straight sections of the conduit relative to one another, which flexural vibrations are generated at the resonance frequency of the vibrating system. The motion detectors 12 and 13 respectively included in the two generally straight sections 7 and 8 of the conduit and a third motion detector 14 affixed to the midsection of the looped section 9 of the conduit measure the flexural vibrations of the conduit. The signals generated by the motion detectors 12, 13 and 14 are transmitted to the filter-amplifier 15 by wires, which signals conditioned by the filter-amplifier 15 are then transmitted to the data processor 16 that analyzes the signals and converts them into the information related to the mass flow rate. The filter-amplifier 15 also feeds information on the numerical value of the resonance frequency to the vibrator power supply 11.

Figure 2:
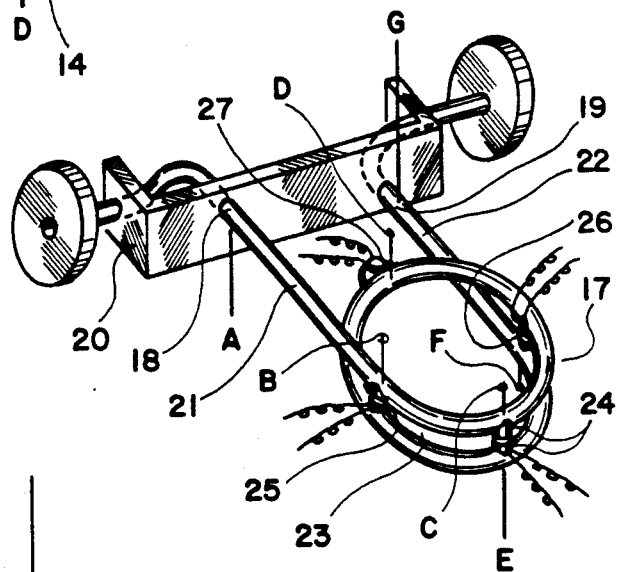
FIG. 2 illustrates a perspective view of another embodiment of the mass flowmeter of the present invention comprising a single 540 degree loop section of the conduit.

In FIG. 2 there is illustrated another embodiment of the mass flowmeter comprising a single conduit 17 with two extremities 18 and 19 affixed to a rigid frame 20, which conduit includes two generally straight sections 21 and 22 respectively extending from the fixed extremities 18 and 19 of the conduit in a parallel and over-hanging arrangement, and connected to one another by a looped section 23 of the conduit of loop angle greater than 450 degrees and less than 630 degrees. The particular embodiment shows a combination having a looped midsection of 540 degree loop angle. An electromagnetic vibrator 24 disposed on the middle plane between the two generally straight and parallel sections 21 and 22 of the conduit vibrates the two halves of the looped section 23 of the conduit respectively connected to the two parallel sections 21 and 22 of the conduit relative to one another in directions generally perpendicular to a plane parallel to the looped section 23 of the conduit. Two motion detectors 25 and 26 respectively disposed at the two junctures between the two generally straight sections 21 and 22, and the looped section 23 of the conduit measure the flexural vibrations of the two halves of the conduit 17. The motion detector 27 disposed at the midsection of the conduit 17 also measures the flexural vibrations of the conduit 17. The motion detectors employed in the embodiments shown in FIGS. 1 and 2 may be position or velocity or acceleration sensors, which can be inductive, capacitive, or strain or stress sensing sensors.

The equation governing the flexural vibration of a conduit containing moving fluid can be written in the form $$EI\frac{\partial^4 v}{\partial x^4} + (m + \rho UA)\frac{\partial^2 v}{\partial t^2} + \rho UA\frac{\partial^2 v}{\partial x \partial t} = 0, \quad (1)$$

where v is the flexural velocity of the conduit, x is the linear coordinate designated following the central axis of the conduit, t is the time, E is the modulus of elasticity of the conduit wall, I is the moment of inertia of the cross section of the conduit, m is the linear density of the conduit, $\rho$ is the fluid density, U is the convective velocity of the fluid, and A is the cross section area of the flow passage in the conduit. The equation (1) applies to all sections of the conduit excluding the section where the electromagnetic vibrator exerts the vibratory force. For the sake of simplicity, it is useful to analyze a solution of the equation (1) that describes the flexural vibration of the two generally straight sections of the conduit A–C and G–E shown in the embodiment of FIG. 1 or 2, wherein the extremities A and G are assumed to be simply supported rather than fixedly supported. It can be easily shown that such a solution can be written in the form $$\frac{v}{v_0} = \sinh\lambda\frac{x}{L} \cdot \sin\omega t \pm \frac{\rho UA\omega L^2}{4EI\lambda^2} \cdot x\sinh\lambda\frac{x}{L} \cdot \cos\omega t, \quad (2)$$

where $v_0$ is the maximum amplitude of the flexural velocity, the coordinate x is measured from the secured end of each of the two sections of the conduit A–C and G–E, L is the length of the conduit section A–C or G–E, and $\omega$ is the circular frequency of the flexural vibration. The plus or minus sign appearing before the second term on the right hand side of the equation (2) respectively applies to the conduit sections A–C and G–E. It is useful to notice that the positive direction of the coordinate x is the same as the direction of the flow U for the first conduit section A–C, while the two are opposite to one another for the second conduit section G–E. The parameter $\lambda$ satisfies the characteristic equation $$\left(\frac{\lambda}{L}\right)^4 - \omega^2 \frac{m + \rho UA}{EI} = 0. \quad (3)$$

The sum and difference of the two flexural vibratory motions respectively measured by the two motion detectors 12 and 13 shown in Figure or 25 and 26 shown in FIG. 2 are given by equations $$\frac{\Sigma v}{v_0} = 2\sinh\lambda\frac{l}{L} \cdot \sin\omega t, \quad (4)$$

$$\frac{\Delta v}{v_0} = \frac{\rho UA\omega L^2}{2EI\lambda^2} l\sinh\lambda\frac{l}{L} \cdot \cos\omega t, \quad (5)$$

where l is the value of the x coordinate at the section where the motion detectors are located. It should be noticed that the sum of the outputs from the two motion detectors given by the equation (4) represents the flexural vibration of the conduit sections containing stationary fluid, while the difference of the outputs from the two motion detectors given by the equation (5) represents the effect of the convective inertia force of the fluid flow that is proportional to the mass flow rate ($\rho UA$). Differential combination of the equations (4) and (5) yields the relationship $$\frac{\Sigma v}{v_0} - \frac{\Delta v}{v_0} = \sin(\omega t - \phi), \text{ where} \quad (6)$$

-continued $$\phi = \tan^{-1}\left[(\rho UA)\frac{\omega L^2 l}{4EI\lambda^2}\right]. \quad (7)$$

The magnitude of the term in the square bracket on the right hand side of the equation (7) is generally very small and, consequently, the equation (7) can be approximated by equation $$\phi \simeq (\rho UA)\frac{\omega L^2 l}{4EI\lambda^2}. \quad (8)$$

The equations (7) and (8) clearly indicate that the mass flow rate ($\rho UA$) through the conduit can be determined from the phase angle defined by equation (6). In actual calibration of a mass flowmeter, the relationship between the mass flow rate ($\rho UA$) and the phase angle $\phi$ should be determined empirically.

Figure 3:
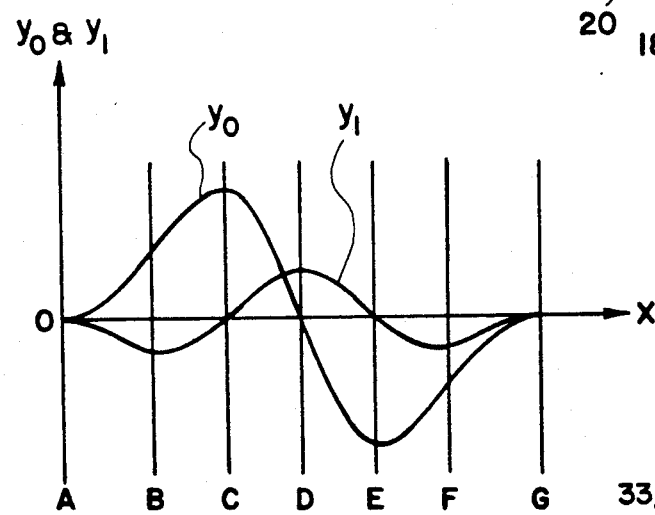
FIG. 3 illustrates the mode of the first order flexural vibration generated by the electromagnetic vibrator and the mode of the second order flexural vibration generated by the convective inertia force of the fluid moving through the vibrating conduit.

In FIG. 3 there is illustrated the mode of deflection of the conduit over the entire length thereof, wherein $y_0$ corresponding to the first term on the right hand side of the equation (2) represents the deflection of the conduit containing stationary fluid, while $y_1$ corresponding to the second term on the right hand side of the equation (2) represents the additional deflection of the conduit resulting from the convective inertia force of the moving fluid through the conduit. It is important to notice that the $y_0$ solely generated by the electromagnetic vibrator is antisymmetric about the midsection or nodal section D of the conduit, while $y_1$ generated by the convective inertia force of the moving fluid is symmetric about the midsection or nodal section D. It should be noticed that the vibrating conduit included in the mass flow meter of the present invention is automatically vibrated at the natural frequency of the second harmonics instead of the first harmonics, which contrasts the existing versions of mass flowmeter using the natural frequency of the first harmonic. In general, the natural frequency of the second harmonics is twice as great as that of the first harmonics. According to the equations (7) or (8), the sensitivity of the mass flowmeter is directly proportional to the natural frequency whereat the conduit is vibrated. As a consequence, the mass flowmeter of the present invention provides a drastically higher sensitivity compared with the existing versions of the mass flowmeter. It is noticed that $y_0$ generated solely by the electromagnetic vibrator vanishes at the nodal section or midsection D of the conduit, while $y_1$ generated by the convective inertia force of the moving fluid becomes maximum at the nodal section D. Therefore, the mass flow rate can also be determined from the amplitude of the outputs from the motion detector 14 shown in FIG. 1 or the motion detector 27 shown in FIG. 2, as the amplitude of the flexural vibration at the nodal section D is proportional to the mass flow rate. It should also be mentioned that the mass flow rate can be determined from the difference in amplitude between the two flexural vibrations respectively measured by the two motion detectors 12 and 13 shown in FIG. 1 or the two motion detectors 25 and 26 shown in FIG. 2. Alternatively, the mass flow rate may be determined by combining all three different outputs from three different motion detectors 12, 13 and 14, or 25, 26 and 27.

Figure 4:
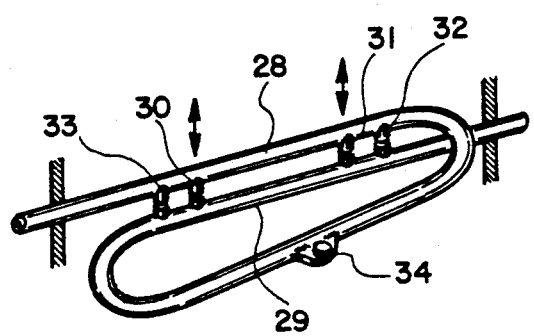
FIG. 4 illustrates a further embodiment of the mass flowmeter of the present invention comprising a single 360 degree loop section of the conduit

In FIG. 4 there is illustrated another embodiment of the mass flowmeter having generally the same construction and operating on the same principles as the embodiment shown in FIG. 1. In this embodiment, the relative flexural vibrations of the two generally straight sections 28 and 29 of the conduit are generated by a pair of electromagnetic vibrators 30 and 31 respectively disposed on two opposite sides of the middle plane between the two fixed extremities of the conduit. The flexural vibrations of the two generally straight sections 28 and 29 of the conduit are respectively measured by the motion detectors 32 and 33, while the flexural vibrations at the nodal section or midsection of the conduit are measured by the motion detector 34. In this and other illustrations of the mass flowmeters which follow, the wires extending from the motion detectors are not shown for the brevity of the illustration.

In FIG. 5 there is illustrated a further embodiment of the mass flowmeter having essentially the same construction as the embodiment shown in FIG. 1 with one exception, that is the pair of motion detectors 35 and 36 of accelerometer type which respectively measure the absolute velocities of the flexural vibrations of the two generally straight sections 37 and 38 of the conduit. The motion detectors 12 and 13 shown in FIG. 1, the motion detectors 25 and 26 shown in FIG. 2, and the motion detectors 32 and 33 shown in FIG. 4 measure the velocities of the flexural vibrations of the generally straight sections of the conduit relative to the fixed extremities thereof or relative to the looped section of the conduit. The flexural vibration at the nodal section or midsection of the conduit is always measured by a motion detector of accelerometer type, that is the case for the motion detector 39 as well as the motion detectors 14 and 27 respectively included in the embodiments shown in FIGS. 1 and 2.

In FIG. 6 there is illustrated an embodiment of the mass flowmeter comprising a single conduit 40 with two extremities 41 and 42 affixed to a rigid frame 43, which conduit includes two generally straight sections 44 and 45 respectively extending from the two fixed extremities 41 and 42 of the conduit in an over-hanging arrangement and connected to one another by a looped section 46 of the conduit that has two loops of loop angle equal to 360 degrees respectively turning in two opposite directions. The midsection of the looped section 44 of the conduit passes through the space between the two generally straight sections 44 and 45 of the conduit. An electromagnetic vibrator 47 disposed on the middle plane between the two fixed extremities 41 and 42 of the conduit vibrates the two generally straight sections 44 and 45 of the conduit. A pair of motion detectors 48 and 49 respectively measure the flexural vibrations of the two generally straight sections 44 and 45. In another embodiment of the mass flowmeter comprising the conduit of the particular geometry shown in FIG. 9, the elements 48 and 49 can be a pair of electromagnetic vibrators instead of the motion detectors, and the element 47 can be a motion detector that measures the flexural vibration of the conduits at the nodal section or midsection of the conduit. Both versions of the embodiment shown in FIG. 6 operate on the same principles as those described in conjunction with FIGS. 1, 2 and 3.

In FIG. 7 there is illustrated an embodiment of the mass flowmeter comprising a single conduit 50 with two extremities 51 and 52 affixed to a rigid frame, that includes two generally straight sections 53 and 54 respectively extending from the two fixed extremities 51 and 52 of the conduit in an over-hanging arrangement and connected to one another by a looped section 55 of the conduit having two 360 degree loops respectively turning in two opposite directions. An electromagnetic vibrator 56 disposed on the middle plane between the two fixed extremities 51 and 52 vibrates the two generally straight sections 53 and 54 of the conduit relative to one another. A pair of motion detectors 57 and 58 respectively measure the flexural vibrations of the two generally straight sections 53 and 54 of the conduit 50. The mass flow rate is determined from the difference in the two flexural vibrations respectively measured by the two motion detectors 57 and 58, which difference may be the phase angle difference or the difference in the amplitude. It should be noticed that the two generally straight sections of the conduit included in the embodiments shown in FIGS. 1, 4, 5 and 6 are disposed on a plane generally perpendicular to the looped section of the conduit and the relative flexural vibrations thereof take place on that plane, while the two generally straight sections of the conduit in the embodiment shown in FIG. 7 are disposed on a plane generally parallel to the looped section of the conduit and vibrated relative to one another thereon.

In FIG. 8 there is illustrated an embodiment of the mass flowmeter comprising a single conduit 59 with two extremities 60 and 61 disposed in line to one another and affixed to a rigid frame, which conduit includes two 360 degrees loops 62 and 63 coaxially disposed about an axis generally parallel to the inlet and outlet legs 60 and 61 respectively extending from the two coils in an in-line arrangement. An electromagnetic vibrator 64 disposed at a position diametrically opposite to the inlet and outlet legs 60 and 61 vibrates the two 360 degrees loops 62 and 63 of conduit relative to one another. A pair of motion detectors 65 and 66 disposed at the two diametrically opposite positions on a plane generally perpendicular to the plane including the inlet and outlet legs 60 and 61 and the electromagnetic vibrator 64 measure the relative flexural vibrations between the two 360 degrees loops at the two diametrically opposite positions. A third motion detector 67 disposed at the nodal section or midsection of the conduit 59 measures the flexural vibrations of the conduit at the nodal point. The mass flowmeter shown in FIG. 8 operates on the same principles as those described in conjunction with FIGS. 1, 2 and 3.

In FIG. 9 there is illustrated an embodiment of the mass flowmeter having essentially the same construction and operating on the same principles as the embodiment shown in FIG. 2 with one exception. In this particular embodiment, the pair of motion detectors 68 and 69 respectively measuring the flexural vibrations of the two generally straight and parallel sections 70 and 71 of the conduit, as well as the motion detector 72 measuring the flexural vibrations of the conduit at the nodal section are of the accelerometer type instead of the inductive or capacitive type motion detectors 25 and 26 employed in the embodiment shown in FIG. 2.

In FIG. 10 there is illustrated an embodiment of the mass flowmeter comprising a single conduit with two extremities 74 and 75 affixed to a rigid frame, which conduit includes two generally straight and parallel sections 76 and 77 respectively extending from the two fixed extremities 74 and 75 of the conduit in an overhanging arrangement and connected to one another by a looped section 78 of the conduit having a 360 degree loop angle. An electromagnetic vibrator 79 disposed at the over-hanging extremities of the two generally straight sections 76 and 77 of the conduit vibrates those sections of the conduit relative to one another. A pair of motion detectors 80 and 81 respectively measure the flexural vibrations of the two generally straight sections 76 and 77 of the conduit in absolute manner or in a manner relative to the nodal section or midsection of the conduit where the third motion detector 82 is disposed. Of course, the motion detector 82 measures the flexural vibrations of the conduit at the nodal section, where the amplitude of the flexural vibration is proportional to the mass flow rate of the fluid moving through the conduit. It should be noticed that the pair of generally straight and parallel sections 76 and 77 of the conduit 73 are disposed on a plane generally perpendicular to the looped section 78 of the conduit and vibrated thereon relative to one another. This embodiment of the mass flowmeter operates on the same principles as those described in conjunction with FIGS. 1, 2 and 3.

In FIG. 11 there is illustrated another embodiment of the mass flowmeter comprising two generally straight parallel sections 83 and 84 of the conduit 85 respectively extending from the two affixed extremities 86 and 87 of the conduit in an over-hanging arrangement, which are connected to one another by a looped section 88 of the conduit having a loop angle close to 360 degrees. An electromagnetic vibrator 89 disposed at the extremities of the two generally straight sections 83 and 84 of the conduit vibrates them relative to one another. A pair of motion detectors 90 and 91 respectively measure the flexural vibrations of the two generally straight sections 83 and 84 in an absolute manner or in a manner relative to the looped section 88 of the conduit. It should be noticed that the two generally straight sections 83 and 84 of the conduit are disposed on a plane generally parallel to the looped section 88 of the conduit, whereon they are vibrated relative to one another. This embodiment of the mass flowmeter operates on the same principles as those described in conjunction with FIGS. 1, 2 and 3.

In FIG. 12 there is illustrated an embodiment of the mass flowmeter comprising a single conduit with two extremities 92 and 93 affixed to a rigid frame, which conduit includes two generally straight sections 94 and 95 respectively extending from the two fixed extremities of the conduit towards one another in an over-hanging arrangement and connected to one another by a looped section 96 of the conduit. The two halves of the looped section 96 of the conduit include two generally straight sections 97 and 98 which are respectively symmetric to the two generally straight sections 94 and 95 of the conduit about planes including the point of overlap between the two halves of the conduit. An electromagnetic vibrator 99 disposed at the point of over-lap vibrates the two halves of the conduit relative to one another. Four motion detectors 101, 102, 103 and 104 respectively included in the four generally straight sections 94, 97, 98 and 95 of the conduit measure the flexural vibrations of the four generally straight sections of the conduit. The over-hanging extremities of the two generally straight sections 97 and 98 adjacent to the midsection of the conduit may be affixed to the rigid frame 104. The mass flow rate is determined from the difference between the two flexural vibrations respectively measured by any two motion detectors, i.e., 100 and 101, 102 and 103, 101 or 103 or 100 and 102, or by averaging that difference over two or more pairs of the motion detectors.

Figure 13:
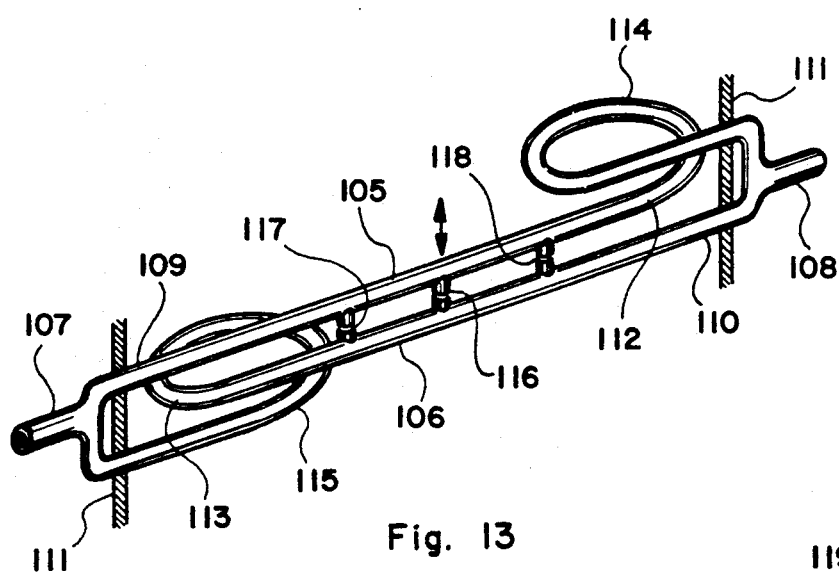
FIG. 13 illustrates an embodiment of the mass flowmeter of the present invention comprising a pair of parallel conduits connected to common inlet and outlet legs in a parallel arrangement, wherein the one extremity of the one of the two parallel conduits and the other extremity of the other of the two parallel conduits include flexible couplings.

In FIG. 13 there is illustrated an embodiment of the mass flowmeter comprising a pair of parallel conduits 105 and 106 respectively connected to the inlet and outlet legs 107 and 108 in a parallel connection. The first extremities 109 and 110 of the two conduits 105 and 106 located at opposite ends to one another are fixedly secured to a rigid frame 111, while the second extremities 112 and 113 respectively include loop sections 114 and 115 which enhance flexural deflections of the two conduits at those extremities. An electromagnetic vibrator 116 disposed at the midsections of the two conduits vibrates them relative to one another. A pair of motion detectors 117 and 118 disposed symmetrically about the midsections of the two conduits respectively measure the relative vibrations between the two halves of the two parallel conduits. The mass flow rate is determined from the difference between the two relative flexural vibrations respectively measured by the two motion detectors 117 and 118, which may be the phase angle difference or the difference in the amplitude of the flexural vibrations.

Figure 14:
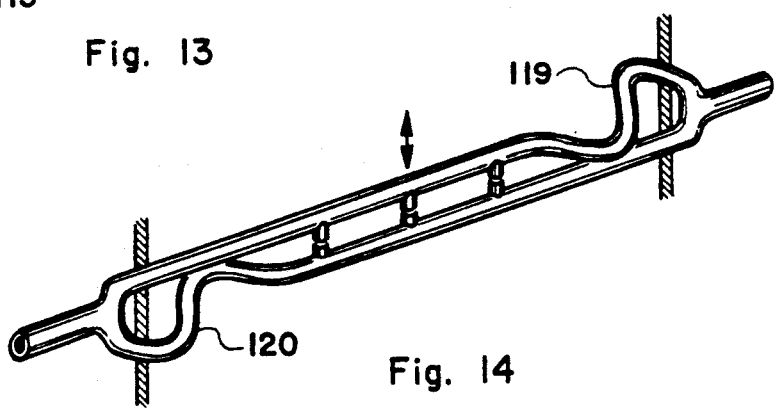
FIG. 14 illustrates another embodiment of the mass flowmeter of the present invention having a construction similar to the embodiment shown in FIG. 13.

In FIG. 14 there is illustrated another embodiment of the mass flowmeter having essentially the same construction and operating on the same principles as the embodiment shown in FIG. 13 with one exception, which is the S-shaped conduit sections 119 and 120 disposed on a plane perpendicular to the plane including the two parallel conduits replacing the looped sections 114 and 115 in the embodiment shown in FIG. 13. In place of the S-shaped sections 119 and 120, a U-shaped over-hanging section disposed on a plane generally perpendicular to the plane including the two parallel conconduits may be employed.

Figure 15:
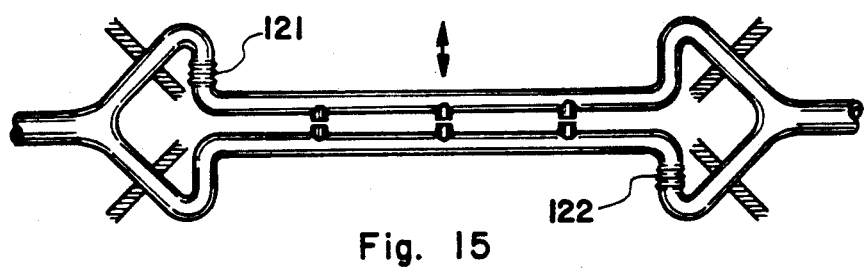
FIG. 15 illustrates a further embodiment of the mass flowmeter of the present invention comprising two parallel conduits including flexible coupling in an arrangement similar to the embodiment shown in FIG. 13.

In FIG. 15 there is illustrated a further embodiment of the mass flowmeter having essentially the same construction and operating on the same principles as the embodiment shown in FIG. 13 with one exception being that the bellow couplings or flexible couplings 120 and 121 replace the looped sections 114 and 115 in the embodiment shown in FIG. 13.

Figure 16:
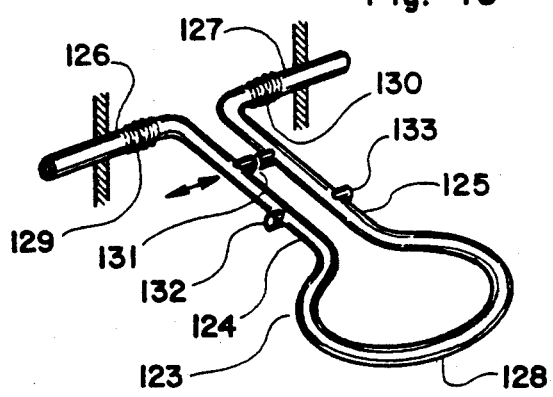
FIG. 16 illustrates an embodiment of the mass flowmeter of the present invention comprising two sections of the conduit disposed in a parallel arrangement and connected to one another at the first extremities and respectively connected to inlet and outlet legs by two flexible couplings, respectively, at the second extremities.

In FIG. 16 there is illustrated an embodiment of the mass flowmeter comprising a single conduit 123, which conduit includes two generally straight sections 124 and 125 extending respectively from the inlet and outlet legs 126 and 127 in a parallel over-hanging arrangement and connected to one another by a curved section 128 of the conduit. The two generally straight sections 124 and 125 are respectively connected to the inlet and outlet legs 126 and 127 by the bellow couplings or flexible couplings 129 and 130. An electromagnetic vibrator 131 disposed near the extremities of the two generally straight sections 124 and 125 connected to the inlet and outlet legs 126 and 127 vibrates the two generally straight sections 124 and 125 relative to one another. A pair of motion detectors 132 and 133 respectively included in the two generally straight sections 124 and 125 of the conduit measure the flexural vibrations thereof respectively. The mass flow rate is determined from the difference between the two flexural vibrations respectively measured by the two motion detectors 132 and 133 which difference may be the phase angle difference of the difference in the amplitude of the flexural vibrations.

Figure 17:
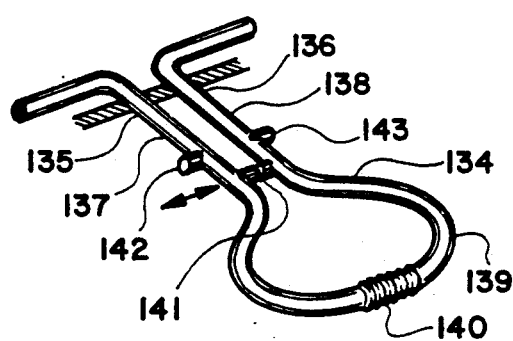
FIG. 17 illustrates another embodiment of the mass flowmeter of the present invention comprising two sections of the conduit respectively extending from the inlet and outlet legs in a parallel arrangement and connected to one another by a flexible coupling.

In FIG. 17 there is illustrated another embodiment of the mass flowmeter comprising a single conduit 134 with two extremities 135 and 136 affixed to a rigid frame, which conduit includes two generally straight sections 137 and 138 respectively extending from the two fixed extremities 135 and 136 of the conduit in a parallel over-hanging arrangement and connected to one another by a curved section 139 of the conduit including a bellow coupling or flexible coupling 140 at the midsection thereof. An electromagnetic vibrator 141 disposed near the curved section 139 of the conduit vibrates the two generally straight sections 137 and 138 of the conduit relative to one another. A pair of the motion detectors 142 and 143 respectively included in the two generally straight sections 137 and 138 measure the flexural vibrations thereof, respectively. This embodiment of the mass flowmeter operates on the same principles as those embodiments shown in FIGS. 10, 11 and 16.

Figure 18:
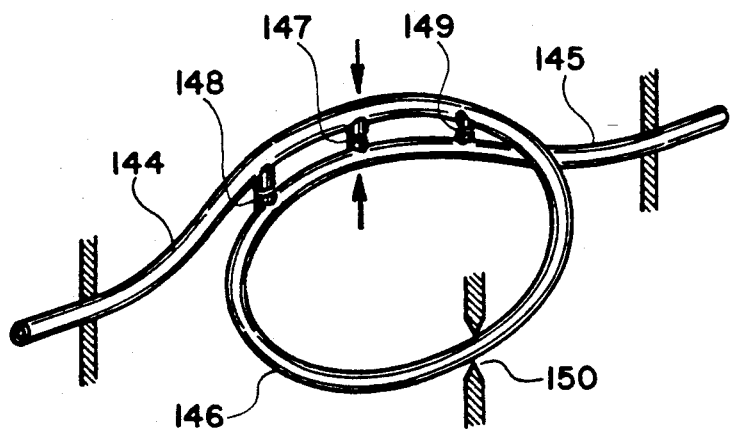
FIG. 18 illustrates a modified version of the embodiment of the mass flowmeter shown in FIG. 1.

In FIG. 18 there is illustrated a modified version of the embodiment of the mass flowmeter shown in FIG. 1. While it is generally preferred to employ a conduit with a looped midsection of 360 degree loop angle as shown in FIG. 1, which combination provides certain advantages in the fabrication and performance of the flowmeter, each of the two end sections of the conduit connected to one another by the looped midsection can be angled away from or towards the center of the looped midsection of the conduit by an angle as large as 45 degrees. In this particular embodiment, each of the two end sections 144 and 145 are angled away from the center of the looped midsection 146 by an angle generally equal to 45 degree. As a consequence, each half of the conduit employed in this particular embodiment of the mass flowmeter is curved over a loop angle generally equal to 225 degrees. The electromagnetic vibrator 147 vibrates the two halves of the conduit relative to one another at a resonance frequency thereof in directions generally perpendicular to a plane including the looped midsection 146 of the conduit. The mass flow rate is determined from the difference in the flexural vibration between the two halves of the conduit respectively measured by the two relative motion sensors 148 and 149. The midsection 150 of the conduit may be secured to a support as shown in the particular embodiment or may be left unsecured or may include a motion sensor as shown in FIG. 1.

Figure 19:
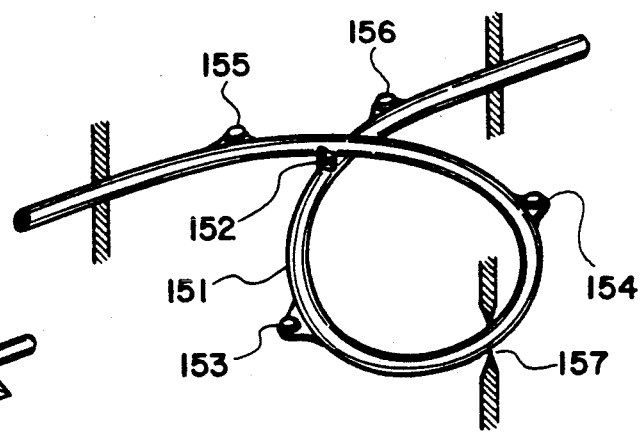
FIG. 19 illustrates another modified version of the embodiment of the mass flowmeter shown in FIG. 1.

In FIG. 19 there is illustrated another modified version of the embodiment of the mass flowmeter shown in FIG. 1, wherein each half of the conduit 151 is curved over a loop angle generally equal to 135 degrees. The electromagnetic vibrator 152 vibrates the two halves of the conduit relative to one another. The flexural vibration of the two halves of the conduit 151 are respectively measured by a pair of motion sensors 153 and 154 or by the pair 155 and 156. The midsection 157 of the conduit 151 may be secured to a support as shown in the particular embodiment or may be left unsecured or may include a motion sensor as shown in FIG. 1. The three different embodiments shown in FIGS. 1, 18 and 19 are particular cases of a conduit employed in the construction of the mass flowmeter, wherein each half of the conduit is curved over a loop angle generally equal to or less than 225 degrees.

Figure 20:
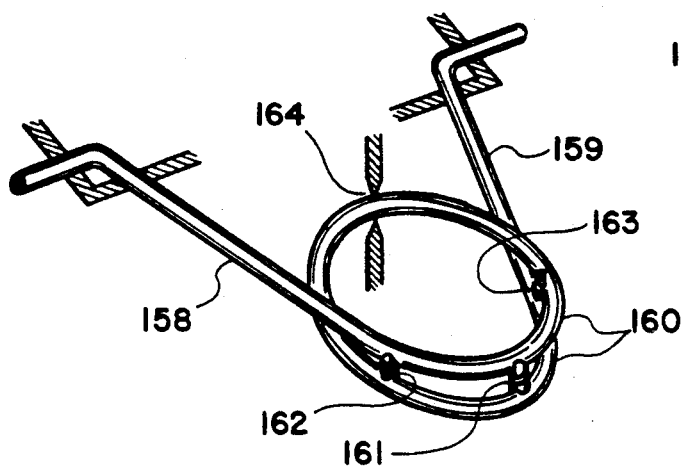
FIG. 20 illustrates a modified version of the embodiment of the mass flowmeter shown in FIG. 2.

In FIG. 20 there is illustrated a modified version of the embodiment of the mass flowmeter shown in FIG. 2. Although it is generally preferred to employ a conduit with a looped midsection of 540 degree loop angle as shown in FIG. 2, as such a combination provides certain advantages in the fabrication and performance of the flowmeter, the two end sections of the conduit connected to one another by the looped midsection can be made to diverge or converge by an angle as large as 90 degrees instead of the parallel arrangement shown in FIG. 2. In this particular embodiment, the two end sections 158 and 159 extends from the looped midsection 160 with a divergence angle generally equal to 90 degrees. As a consequence, each half of the conduit employed in this particular embodiment is curved over a loop angle generally equal to 225 degrees. The electromagnetic vibrator 161 vibrates the two halves of the conduit relative to one another at a natural frequency thereof in directions generally perpendicular to a plane parallel to the looped midsection of the conduit, while two relative motion sensors 162 and 163 respectively measure the flexural vibrations of the two halves of the conduit. The midsection 164 of the conduit may be secured to a support as shown in the particular embodiment or may be left unsecured or may include a motion sensor as shown in FIG. 2.

Figure 21:
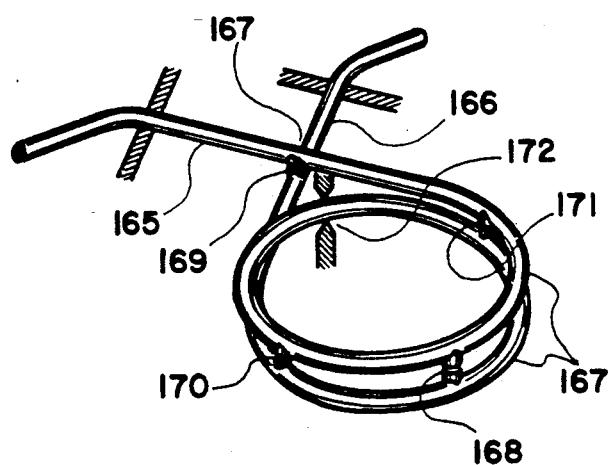
FIG. 21 illustrates another modified version of the embodiment of the flowmeter shown in FIG. 2.

In FIG. 21 there is illustrated another modified version of the embodiment of the mass flowmeter shown in FIG. 2. The two end sections 165 and 166 extend from the looped midsection 167 in a converging arrangement with a convergence angle generally equal to 90 degrees and cross one another with a space therebetween at a section 168. As a consequence, each half of the conduit employed in this particular embodiment is curved over a loop angle generally equal to 315 degrees. The two halves of the conduit are vibrated relative to one another by an electromagnetic vibrator 168 or 169, while the two relative motion sensors 170 and 171 respectively measure the flexural vibrations of the two halves of the conduit. The midsection 172 of the conduit may be secured to a support as shown in the particular embodiment or may be left unsecured or may include a motion sensor as shown in FIG. 2. The embodiments shown in FIGS. 2, 20 and 21 are particular cases of a conduit employed in the construction of the mass flowmeter, wherein each half of the conduit is curved over a loop angle greater than 225 degrees and less than or generally equal to 315 degrees.

It should be mentioned that the flexural vibrations at the nodal section is generated by the convective inertia force of the moving fluid through the vibrating conduit as well as by the noises associated with pipe line vibrations. Therefore, in determining the mass flow rate from the amplitude ratio of the flexural vibration at the nodal section to that at the conduit section including the electromagnetic vibrator, it is necessary to substract the noises from the total signals detected by the motion detector disposed at the nodal section, which noises can be measured by another motion detector disposed at a strategically selected section of the vibrating conduit. In determining the mass flow rate, it is generally preferred to use the phase angle difference between the two flexural vibrations respectively measured by the two motion detectors respectively disposed on two opposite sides about the section where the electromagnetic vibrator is disposed.

While the principles of the present inventions have now been made clear by the illustrative embodiments, it will be immediately obvious to those skilled in the art that many modifications of structures, arrangements, proportions, elements and materials which are particularly adapted to the specific working environments and operating conditions in the practice of the inventions can be made without departing from those principles. It is not desired to limit the inventions to the particular illustrated embodiments shown and described and accordingly, all suitable modifications and equivalents may be resorted to falling within the scope of the inventions as defined by the claims which follow.

I claim:

1. An apparatus for measuring flow rate of media comprising in combination:
    a) a conduit of a looped configuration having two extremities and a midsection thereof secured to a support and substantially free of constraint disposed intermediate one of the two secured extremities and the secured midsection of the conduit and intermediate the secured midsection and the other of the two secured extremities of the conduit restraining flexural vibration of the conduit in directions generally perpendicular to a plane generally parallel to looped section of the conduit; said conduit including a first half section extending from one of the two secured extremities of the conduit in an over-hanging arrangement and curved over a loop angle generally equal to or less than 315 degrees, and a second half section extending from the other of the two secured extremities of the conduit in an over-hanging arrangement and curved over a loop angle generally equal to or less than 315 degrees, wherein at least a portion of said first half section and at least a portion of said second half section of the conduit over-lap one another with a space therebetween;
    b) means for exerting a vibratory force on the overlapping portions of said first and second half sections of the conduit, said vibratory force generating relative flexural vibration between said first and second half sections of the conduit in directions generally perpendicular to a plane generally parallel to the looped section of the conduit; and
    c) means for measuring difference in the flexural vibration between said first and second half sections of the conduit as a measure of mass flow rate of media moving through the conduit.

2. The combination as set forth in claim 1 wherein said means for measuring difference in the flexural vibration between said first and second half sections of the conduit includes a first and second motion sensors respectively measuring the flexural vibrations of said first and second half sections of the conduit.

3. The combination as set forth in claim 2 wherein said first motion detector measures relative flexural vibration between said first and second half sections of the conduit at a position intermediate one of said two secured extremities of the conduit and the midsection of the conduit, and said second motion detector measures relative flexural vibration between said first and second half sections of the conduit at a position intermediate the other of said two secured extremities of the conduit and the midsection of the conduit.

4. The combination as set forth in claim 1 wherein each of the first and second half sections of the conduit is curved over a loop angle generally equal to 180 degrees.

5. The combination as set forth in claim 1 wherein each of the first and second half sections of the conduit is curved over a loop angle generally equal to 270 degrees.

* * * * *